US012759281B2

(12) United States Patent
Maruno et al.

(10) Patent No.: US 12,759,281 B2
(45) Date of Patent: Oct. 13, 2026

(54) PRINTING DEVICE AND PRINTING METHOD

(71) Applicants: NIHON DENSHI SEIKI CO., LTD., Kashiba (JP); NATIONAL INSTITUTE OF ADVANCED INDUSTRIAL SCIENCE AND TECHNOLOGY, Tokyo (JP)

(72) Inventors: Masanori Maruno, Kashiba (JP); Atsushi Hirata, Kashiba (JP); Akihiko Ohgata, Kashiba (JP); Yasuyuki Kusaka, Tsukuba (JP)

(73) Assignee: NIHON DENSHI SEIKI CO., LTD, Kashiba (JP)

( * ) Notice: Subject to any disclaimer, the term of this patent is extended or adjusted under 35 U.S.C. 154(b) by 0 days.

(21) Appl. No.: 18/842,457

(22) PCT Filed: Feb. 28, 2023

(86) PCT No.: PCT/JP2023/007220

§ 371 (c)(1),
(2) Date: Aug. 29, 2024

(87) PCT Pub. No.: WO2023/167164

PCT Pub. Date: Sep. 7, 2023

(65) Prior Publication Data

US 2025/0187325 A1 Jun. 12, 2025

(30) Foreign Application Priority Data

Mar. 4, 2022 (JP) ................................ 2022-033170

(51) Int. Cl.
*B41F 3/20* (2006.01)
*B41F 17/00* (2006.01)
*B41M 1/26* (2006.01)

(52) U.S. Cl.
CPC ............. *B41F 3/20* (2013.01); *B41F 17/001* (2013.01); *B41M 1/26* (2013.01)

(58) Field of Classification Search
None
See application file for complete search history.

(56) References Cited

U.S. PATENT DOCUMENTS 6,158,341 A 12/2000 Holmberg
7,997,195 B2 * 8/2011 Seo ....................... B41F 17/001 101/212

(Continued)

FOREIGN PATENT DOCUMENTS

JP H1158921 A 3/1999
JP 2008046643 A 2/2008

(Continued)

OTHER PUBLICATIONS

International Search Report and Written Opinion of the ISA for PCT/JP2023/007220 dated Apr. 25, 2023, 11 pages.

(Continued)

*Primary Examiner* — Joshua D Zimmerman
(74) *Attorney, Agent, or Firm* — Nixon & Vanderhye, P.C.

(57) ABSTRACT

A printing device is used, which includes a substrate table having a flat surface and holding a target, an arc table having a curved portion, and a controller and configured such that the controller swings the arc table in a state in which the curved portion holding ink faces the substrate table and causes the arc table to contact the target to transfer the ink onto the target. Moreover, a printing method is used, which includes an application step of applying ink to an arc table, a receiving step of receiving part of the ink by a printing plate on a printing plate table by contact between the ink on the arc table and the printing plate, and a transfer step of (Continued)

transferring the ink remaining on the arc table onto a target on a substrate table.

6 Claims, 9 Drawing Sheets

(56) References Cited

U.S. PATENT DOCUMENTS

| | | | | |
|---|---|---|---|---|
| 2008/0041253 | A1 | 2/2008 | Seo et al. | |
| 2012/0037023 | A1 | 2/2012 | Suzuki et al. | |
| 2013/0025482 | A1 | 1/2013 | Sugihara | |
| 2016/0340527 | A1* | 11/2016 | Son | C09D 11/033 |
| 2017/0100955 | A1 | 4/2017 | Kanazawa | |

FOREIGN PATENT DOCUMENTS

| | | | |
|---|---|---|---|
| JP | 2010253770 | A | 11/2010 |
| JP | 2013022944 | A | 2/2013 |
| JP | 2013071303 | A | 4/2013 |
| JP | 2016010965 | A | 1/2016 |

OTHER PUBLICATIONS

International Search Report and Written Opinion of the ISA for PCT/JP2023/007220 dated Apr. 25, 2023 with English translation, 16 pages.
Notice of Reasons for Refusal Office Action in corresponding JP Application No. 2024-504686 dated Nov. 13, 2025. (7pages).

* cited by examiner

PRINTING DEVICE AND PRINTING METHOD

CROSS-REFERENCE TO RELATED APPLICATIONS

This application is the U.S. national phase of International Application No. PCT/JP2023/007220 filed Feb. 28, 2023 which designated the U.S. and claims priority to JP 2022-033170 filed Mar. 4, 2022, the entire contents of each of which are hereby incorporated by reference.

TECHNICAL FIELD

The present invention relates to a printing device and a printing method. Particularly, the present invention relates to a printing device and a printing method using a transfer roller.

BACKGROUND ART

There has been a method (Patent Documents 1, 2) of using a transfer roller as a printing device. Various patterns can be printed without exposure and development.

CITATION LIST

Patent Document

PATENT DOCUMENT 1: Japanese Patent Application No. 2010-253770

PATENT DOCUMENT 2: Japanese Patent Application No. 2013-22944

SUMMARY OF THE INVENTION

Technical Problem

However, in the methods of Patent Documents 1, 2, misalignment is caused due to significant unevenness in the rotation speed of the roll.

For this reason, the object of the present application is to provide a printing device and a printing method with less misalignment in the case of a printing device using a transfer roller.

Solution to the Problem

In order to solve the above-described problems, a printing device is used, which includes a substrate table having a flat surface and holding a target, an arc table having a curved portion, and a controller and configured such that the controller swings the arc table in a state in which the curved portion holding ink faces the substrate table and causes the arc table to contact the target to transfer the ink onto the target.

Moreover, a printing method is used, which includes an application step of applying ink to an arc table, a receiving step of receiving part of the ink by a printing plate on a printing plate table by contact between the ink on the arc table and the printing plate, and a transfer step of transferring the ink remaining on the arc table onto a target on a substrate table.

Advantages of the Invention

According to the printing device of the present invention, the printing device and the printing method with less misalignment can be provided.

DESCRIPTION OF EMBODIMENTS

Embodiment

<Printing Device>

First, a printing device 100 will be described as one example.

Figure 1A:
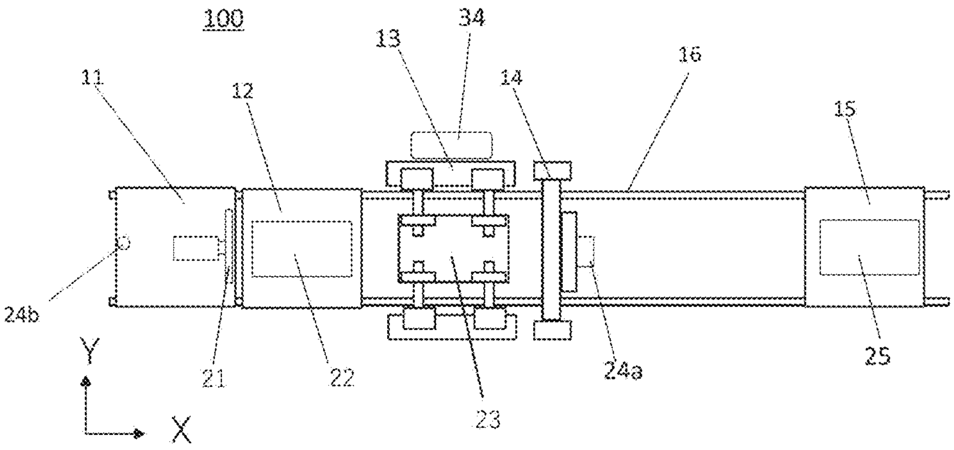
FIG. 1A is a top view of a printing device of an embodiment.
Figure 1B:
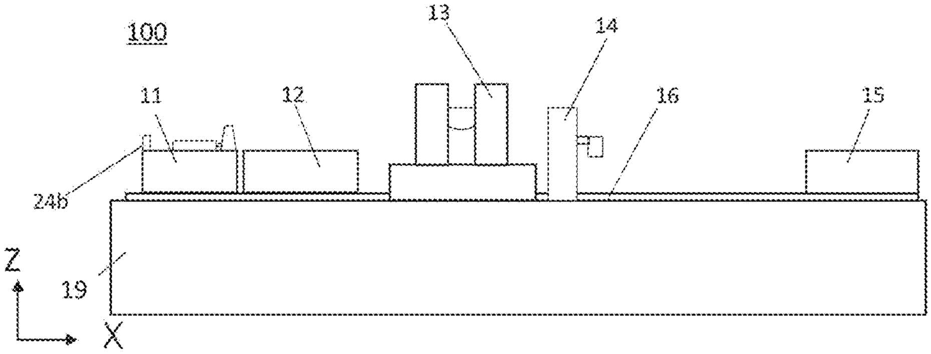
FIG. 1B is a front view of the printing device of the embodiment.
Figure 1C:
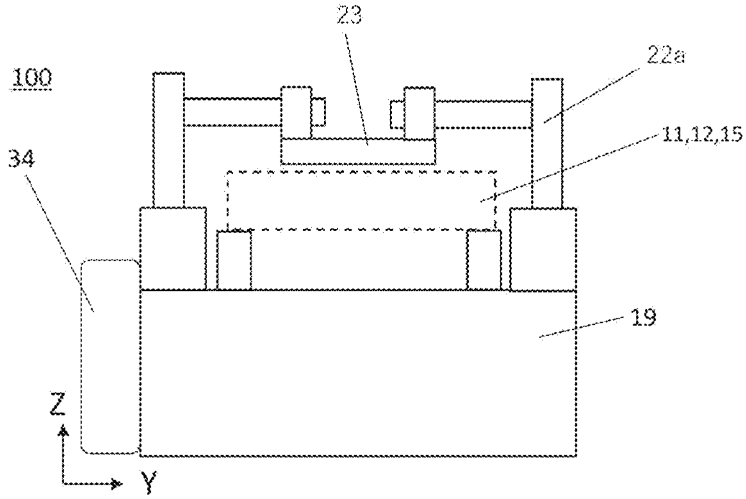
FIG. 1C is a side view of the printing device of the embodiment.

FIGS. 1A to 1C are top, front, and side views of the printing device 100 of the embodiment, respectively.

The printing device 100 includes a mount 19 as a base for the entire printing device 100. A conveyor 16 is located on the mount 19, and an application table 11, a printing plate table 12, an arc swing unit 13, an alignment unit 14, and a substrate table 15 are located on the conveyor 16.

The conveyor 16 includes, e.g., two rails, and the application table 11, the printing plate table 12, and the substrate table 15 move thereon. The arc swing unit 13 and the alignment unit 14 are placed over the conveyor 16, and are fixed to the mount 19. The application table 11, the printing plate table 12, and the substrate table 15 can pass under the arc swing unit 13 and the alignment unit 14.

A controller 34 controls the entirety of the printing device 100. The controller 34 is, e.g., a personal computer. The controller 34 has a program, and for example, saves and controls various types of data. The controller 34 controls the entirety of the printing device 100. A mechanism, a motor, etc. for moving each table are not shown.

An X-direction is a direction in which the application table 11, the printing plate table 12, and the substrate table 15 move. A Y-direction is a direction perpendicular to the X-direction in the horizontal direction, and is the width direction of the application table 11, the printing plate table 12, and the substrate table 15. A Z-direction is the vertical direction (direction perpendicular to the X-direction and the Y-direction).

The printing device 100 is a printing device using a method of forming a reverse pattern by partially removing an ink film (solid film), which has a uniform thickness on the surface of an arc table 23 of the arc swing unit 13, by a printing plate 22 and subsequently transferring the reverse pattern onto a target 25.

That is, the printing device 100 forms the reverse pattern of the ink on the surface of the arc table 23 by contact between the arc table 23 and the printing plate 22. Thereafter, the ink on the arc table 23 is printed onto the target 25.

The printing device 100 can be used, for example, as a printing device when an electronic device pattern (e.g., printed electronic device) is manufactured. Moreover, the printing device 100 can also be used, for example, as a semiconductor manufacturing device when a pattern such as a wiring layer, an insulating layer, a plating seed layer, a semiconductor thin film layer, or a resist layer is formed on the target 25 (substrate) in a semiconductor manufacturing step. For example, silver nano ink or copper nano ink can be used as the material of the wiring layer.

Note that a unit that cleans the surfaces of the arc table 23 and the printing plate 22 on regular basis or every time may be provided.

For example, as another form of the printing device 100, the application table 11, the printing plate table 12, and the substrate table 15 may be integrated. That is, the application table 11, the printing plate table 12, and the substrate table 15 may be moved integrally.

Alternatively, the arc swing unit 13 and the alignment unit 14 may be placed on the conveyor 16, and the application table 11, the printing plate table 12, and the substrate table 15 may be fixed. That is, the application table 11, the printing plate table 12, and the substrate table 15 may be fixed, and the arc swing unit 13 and the alignment unit 14 may be moved thereon.

<Arc Table 23>

Figure 2A:
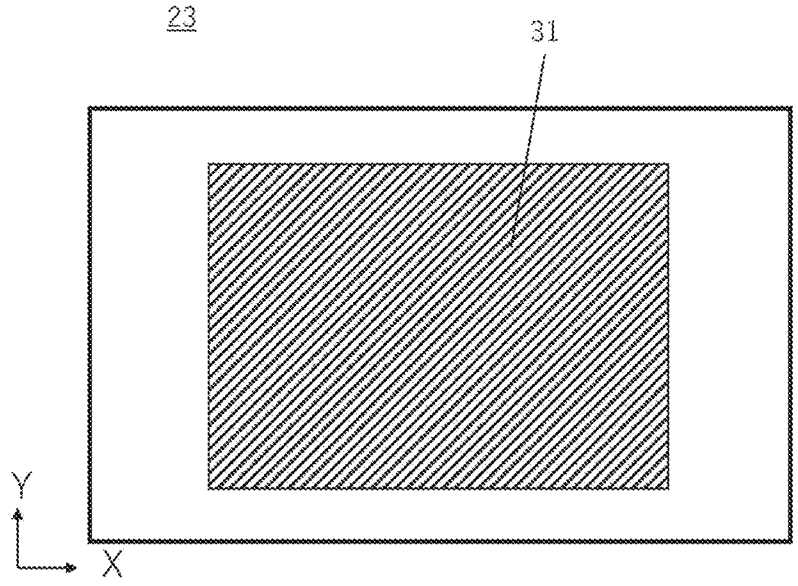
FIG. 2A is a plan view of an arc table of the embodiment.
Figure 2B:
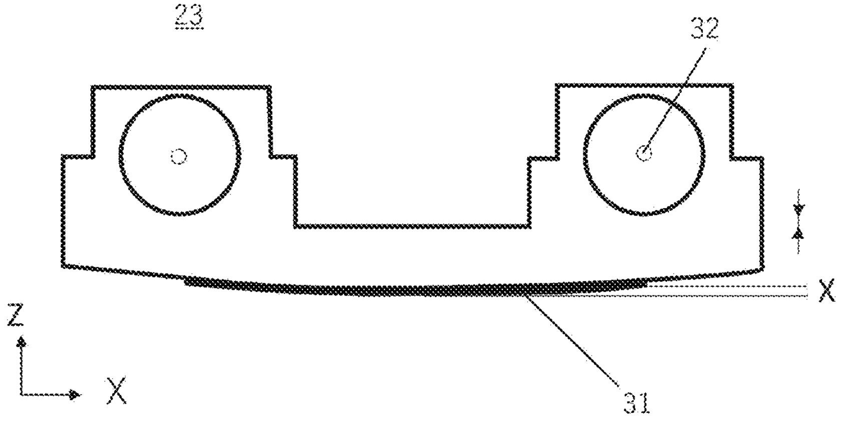
FIG. 2B is a side view of the arc table of the embodiment.

The arc table 23 may have a curved surface of part of a circular column or a curved surface of part of an elliptical column. The arc table 23 is shown in a plan view of FIG. 2A and a side view of FIG. 2B. The arc table 23 is part of a rotating body that transfers the reverse pattern of the ink onto the target 25. The arc table 23 is supported by the arc swing unit 13.

The arc table 23 may be part of a circular column or part of an elliptical column. In order to enhance printing position accuracy, a change in a printing position in association with a printing pressure decreases as the curvature radius of the arc table increases, and for example, the curvature radius is 1000 mm or more and preferably 2000 mm or more. The arc table 23 has, on the surface thereof, a transfer sheet 31, and the surface of the transfer sheet 31 handles the ink. In a case where the arc table 23 itself or the surface of the arc table 23 is made of a material similar to that of the transfer sheet 31, the transfer sheet 31 is not necessary.

The transfer sheet 31 is, e.g., a silicone water-repellent blanket. For example, the arc table 23 is configured such that a metal body is wrapped with the transfer sheet 31.

<Printing Plate 22>

Figure 3:
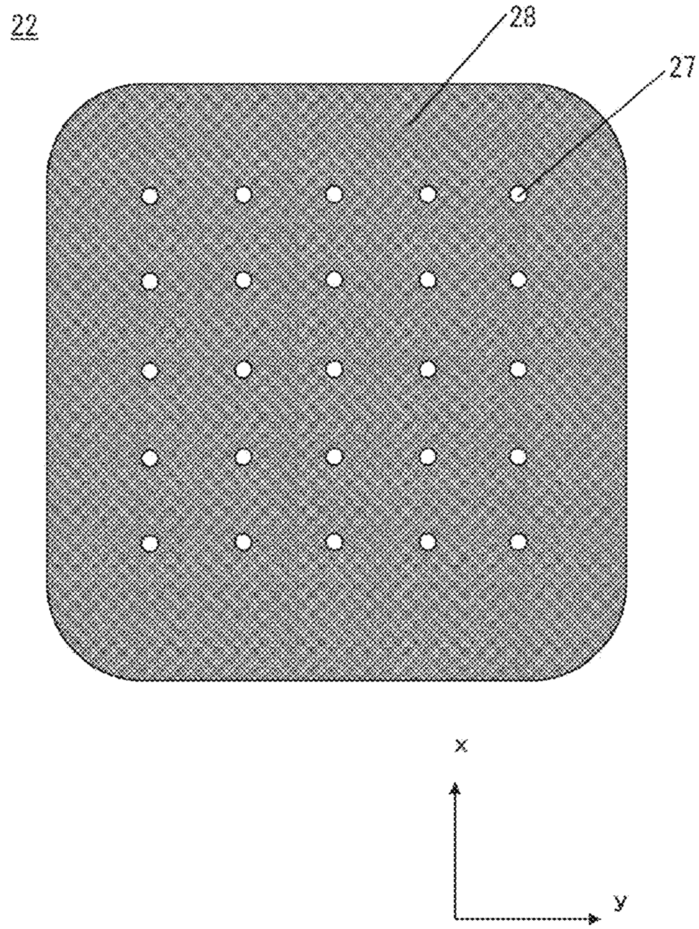
FIG. 3 is a top view of a printing plate of the embodiment.

A top view of the printing plate 22 is shown in FIG. 3. The printing plate 22 is a plate (e.g., master plate) having a corrugated surface shape or a flat plate (adhesion contrast plate). In the present embodiment, a relief printing plate is used as the printing plate 22. Moreover, the printing plate 22 is mounted on the printing plate table 12. Further, the printing plate 22 is moved in the X-direction by the conveyor 16 with mounted on the printing plate table 12.

Figure 4:
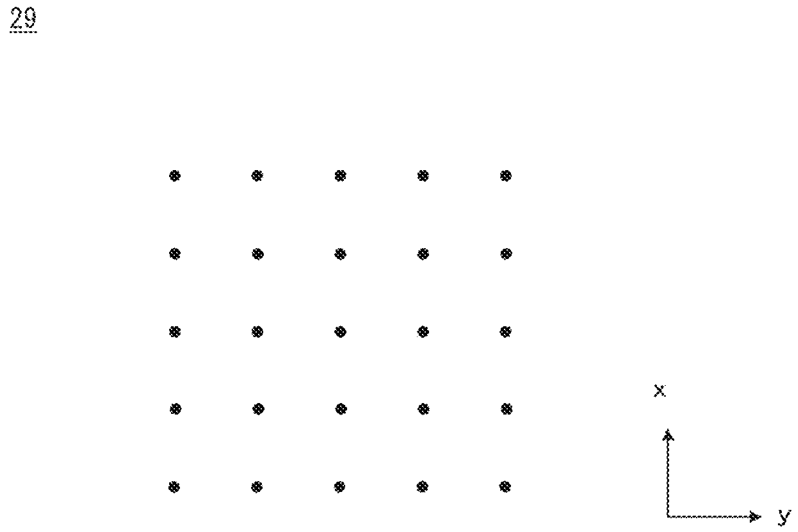
FIG. 4 is a top view of a printing pattern of the embodiment.

The printing plate 22 has, on the surface thereof, a raised portion 28 corresponding to the reverse pattern of the pattern printed on the target 25. The raised portion 28 of the printing plate 22 contacts the surface of the arc table 23, and in this manner, the ink is partially removed from the ink film on the surface of the arc table 23 and a printing pattern 29 which is a reverse pattern corresponding to a recessed portion 27 is formed. FIG. 4 shows a top view of the printing pattern 29. The shapes of the raised portion 28 and the recessed portion 27 shown in FIG. 3 and the shape of the printing pattern 29 shown in FIG. 4 are examples, and may be arbitrary shapes such as wiring for forming an electronic circuit. Note that in the case of using the adhesion contrast plate, a portion to which the ink easily adheres and a portion to which the ink does not easily adhere are provided corresponding to the above-described pattern.

<Target 25>

The target 25 is a target on which the pattern is formed. For example, a flat plate-shaped, film-shaped, or sheet-shaped printing target is used as the target 25. Moreover, the target 25 is mounted on the substrate table 15. Further, the target 25 is moved in the X-direction by the conveyor 16 with mounted on the substrate table 15.

The reverse pattern (printing pattern 29) formed on the surface of the arc table 23 is transferred onto the target 25. That is, the desired printing pattern 29 is printed onto the target 25.

<Printing Plate Table 12>

The printing plate 22 is mounted on the printing plate table 12, and the printing plate table 12 fixes the printing plate 22. The printing plate table 12 fixes the printing plate 22, for example, using an electrostatic chuck, a porous chuck, or a vacuum chuck. Moreover, the printing plate table 12 is moved in a conveying direction (X-direction in FIG. 1) by the conveyor 16 with the printing plate 22 fixed. Note that for other tables, a method of fixing a component thereto is similar to that described above.

<Substrate Table 15>

The substrate table 15 has a flat upper surface, and the target 25 is mounted thereon. The substrate table 15 fixes the target 25. As in the printing plate table 12, the substrate table 15 fixes the target 25, for example, using an electrostatic chuck, a porous chuck, or a vacuum chuck. Moreover, the substrate table 15 is moved in the conveying direction (X-direction in FIG. 1) by the conveyor 16 with the target 25 fixed.

Note that each of the printing plate table 12 and the substrate table 15 may include a mechanism (not shown) that slightly moves the mounted printing plate 22 or target 25 in the X-direction, the Y-direction, the Z-direction, a rotation direction about the X-direction, a rotation direction about the Y-direction, and a rotation direction about the Z-direction. With this configuration, the printing plate table 12 and the substrate table 15 can adjust misalignment of the printing plate 22 or the target 25.

<Application Table 11>

The application table 11 has, on the upper surface thereof, a die coater 21 (nozzle). A discharge port of the die coater 21 (nozzle) faces up. A not-shown ink supplier is provided to apply the ink to the arc table 23. The application table 11 has a second recognizer 24*b*, and can measure the shape and swing of the arc swing unit 13. The printing plate table 12 may have the second recognizer 24*b*. The second recognizer 24*b* is, e.g., a laser displacement meter.

<Alignment Unit 14>

The alignment unit 14 has a first recognizer 24*a*, and detects the positions of the printing plate 22 and the target 25.

The first recognizer 24*a* is a photographing device such as a digital camera or an image sensor, and detects the position of the pattern on the printing plate 22 and the target 25.

<Controller 34>

The controller 34 is a unit that controls operation of each table, discharge of the ink from the die coater, alignment operation, and operation of the arc table 23, and controls the entirety of the printing device 100.

<Conveyor 16>

The conveyor 16 is a mechanism that moves the printing plate table 12, the substrate table 15, and the application table 11 (in the X-direction in FIG. 1) under the arc table 23 and the first recognizer 24*a*. The conveyor 16 includes, e.g., the rails. In the present embodiment, a linear guide and a linear motor are used as the conveyor 16. Note that as the conveyor 16, other well-known mechanisms capable of moving the printing plate table 12 etc. may be used.

<Printing Method>

Figure 5:
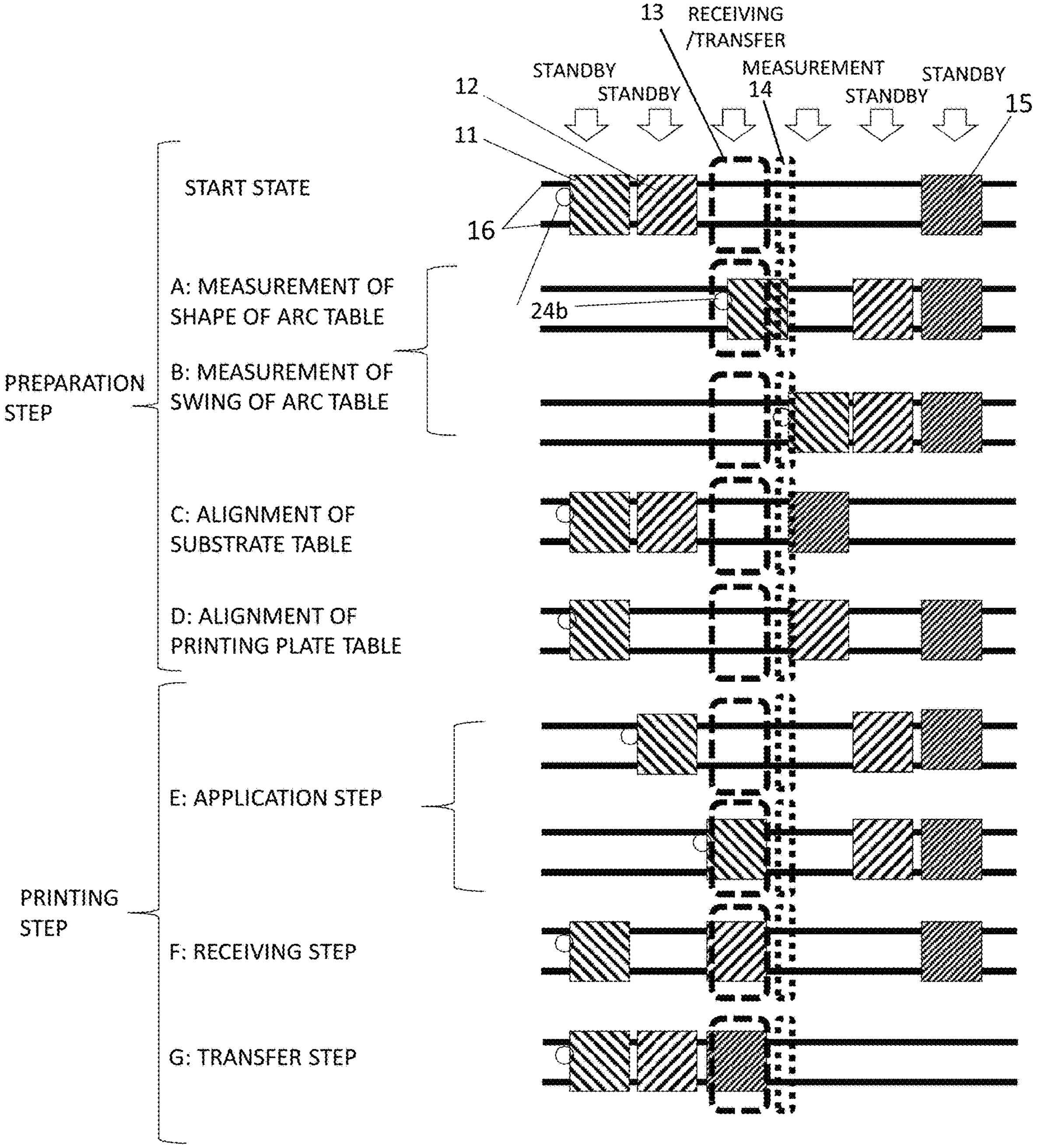
FIG. 5 is a view showing a printing process of the embodiment.

FIG. 5 show a printing process. The printing process includes a preparation step and a printing step. Each table stands by or moves on the conveyor 16 to perform each process.

The preparation step is a step of performing, e.g., position adjustment and measurement before the printing step. In a start state, the application table 11, the printing plate table 12, and the substrate table 15 are at standby positions. The positions of these tables on the conveyor 16 are in this order in the X-axis direction.

A: Measurement of Shape of Arc Table 23: the shape of the arc table 23 on the arc swing unit 13 is measured. The laser displacement meter as the second recognizer 24*b* is mounted on a back portion of the application table 11, and the application table 11 is moved such that the laser displacement meter measures the shape of the arc table 23 from below. The printing plate table 12 may have the second recognizer 24*b*, and the shape of the arc table 23 may be measured while the printing plate table 12 is moving in a manner similar to that described above. In a case where the shape of the arc table 23 is known in advance, such measurement may be omitted.

B: Measurement of Swing of Arc Table 23: by <Trochoid Control> described below, the arc table 23 is swung to a specific position, the application table 11 or the printing plate table 12 equipped with the laser displacement meter is moved in synchronization with such swing, and the height of the arc table 23 is measured by the laser displacement meter. A: the above-described synchronous measurement is performed for the lowest point of the arc table 23 obtained in advance in measurement of the shape of the arc table 23 so that the amount of variation in the amount of contact (printing pressure) between the arc and the substrate can be estimated. A: in a case where the measurement of the shape of the arc table 23 is omitted, the lower point estimated from a design drawing may be used as a substitute. In a case where a variation in the measurement value is great, the arc swing is adjusted by <Correction Method> described below.

A: Measurement of Shape of Arc Table 23 and B: Measurement of Swing of Arc Table 23 are performed mainly for determining a control parameter for swinging the arc table 23, and are not necessarily performed in every printing and it is enough to perform such measurement, e.g., at the time of starting the device.

Further, as described later, the arc swing can be adjusted without the laser displacement meter, and in this case, A: Measurement of Shape of Arc Table 23 and B: Measurement of Swing of Arc Table 23 may be omitted.

C: Alignment of Substrate Table: the substrate table 15 passes under the alignment unit 14, and the position of the target 25 on the substrate table 15 is recognized. The position of the target 25 is adjusted to a certain reference. The substrate table 15 has a mechanism capable of moving the substrate table 15 in the horizontal (X, Y) direction and a θ-direction. This mechanism may be omitted, e.g., in a case where there is no pattern for the target 25. That is, the mechanism may be omitted, e.g., in a case where printing is performed on an arbitrary position on the target 25.

D: Alignment of Printing Plate Table: the printing plate table 12 passes under the alignment unit 14, and the position of the printing plate 22 on the printing plate table 12 is recognized. The position of the printing plate 22 is adjusted to a certain reference. The printing plate table 12 has a mechanism capable of moving the printing plate table 12 in the horizontal (X, Y) direction and the θ-direction. This mechanism is effective, e.g., in a case where the printing plate 22 is detached and cleaned outside the device. This mechanism may be omitted if the position of the printing plate 22 is not changed.

Note that needless to say, each stage, each table, the conveyor, etc. are placed horizontally. That is, these components are placed perpendicularly to the Z-direction (height direction).

The printing step is a step of performing printing on the printing target. In the preparation step, each position has been already adjusted.

E: Application Step: the application table 11 moves to below the arc table 23 of the arc swing unit 13. Then, by <Trochoid Control> described below, the application table 11 moves while the arc table 23 is swinging, and in this manner, the die coater 21 applies the ink to the transfer sheet 31. The ink is applied not as a pattern, but as a uniform film over the entire transfer sheet 31.

At this time, the arc table 23 may move up and down as described below.

F: Receiving Step: the printing plate table 12 moves to below the arc table 23 of the arc swing unit 13. The arc table 23 moves in the Z-direction and the X-direction, and swings by <Trochoid Control> described below. Accordingly, the solid film on the transfer sheet 31 contacts the printing plate 22, and the ink is removed. The remaining pattern is the printing pattern 29 to be printed.

Figure 6A:
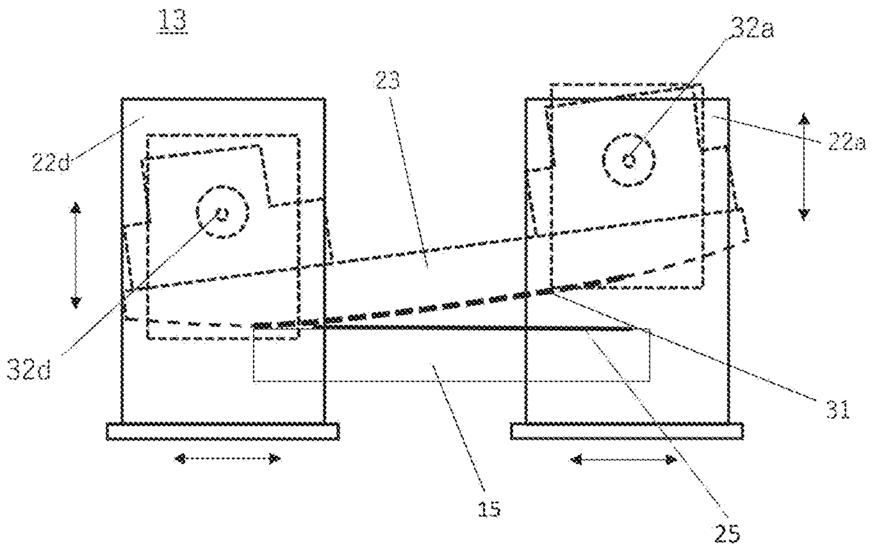
FIG. 6A is a side view of an arc swing unit of the embodiment.
Figure 6B:
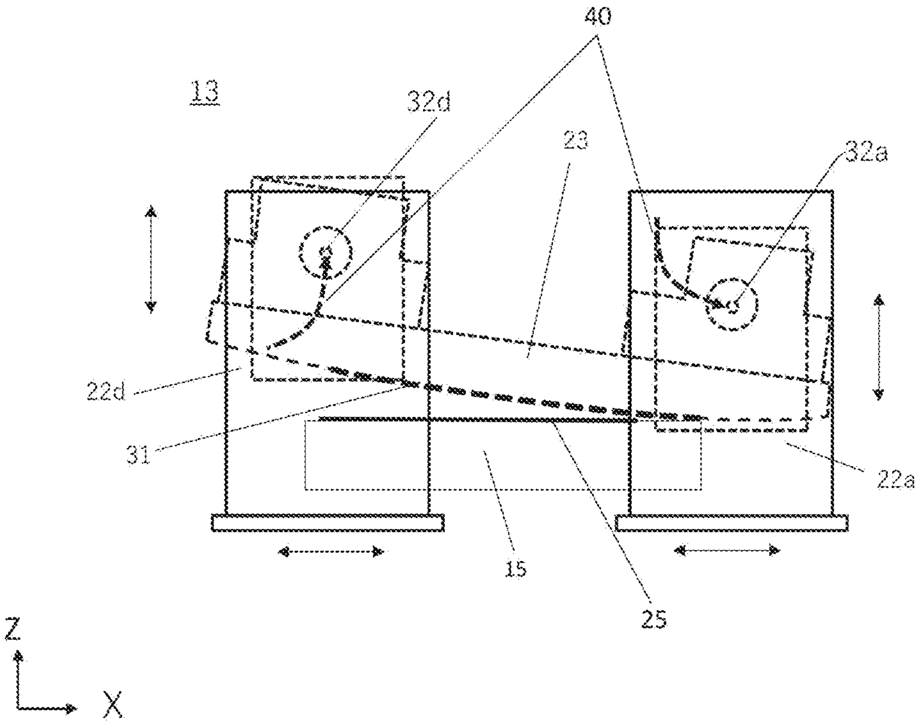
FIG. 6B is a side view of the arc swing unit of the embodiment.

G: Transfer Step: the substrate table 15 moves to below the arc table 23. The arc table 23 moves in the Z-direction and the X-direction, and swings by <Trochoid Control> described below. Accordingly, the arc table 23 is pressed against the target 25, and the ink of the printing pattern 29 is printed thereon. FIGS. 6A and 6B show side views. FIG. 6A shows a state at the time of starting printing the ink onto the target 25 (not shown) on the substrate table 15, and FIG. 6B shows a state at the time of ending such printing. The substrate table 15 does not move during printing, and the arc table 23 moves in the Z-direction and the X-direction. In this manner, printing can be performed with favorable position accuracy.

In the case of subsequently performing printing, the printing plate 22 and the arc table 23 are preferably cleaned.

Note that the substrate table 15, the arc table 23, and the controller 34 are essential components and other components may be omitted. The problems of the present application can be solved by these essential components. The other components have been described above as examples, but components other than above may be employed.

<Swing>

Figure 7A:
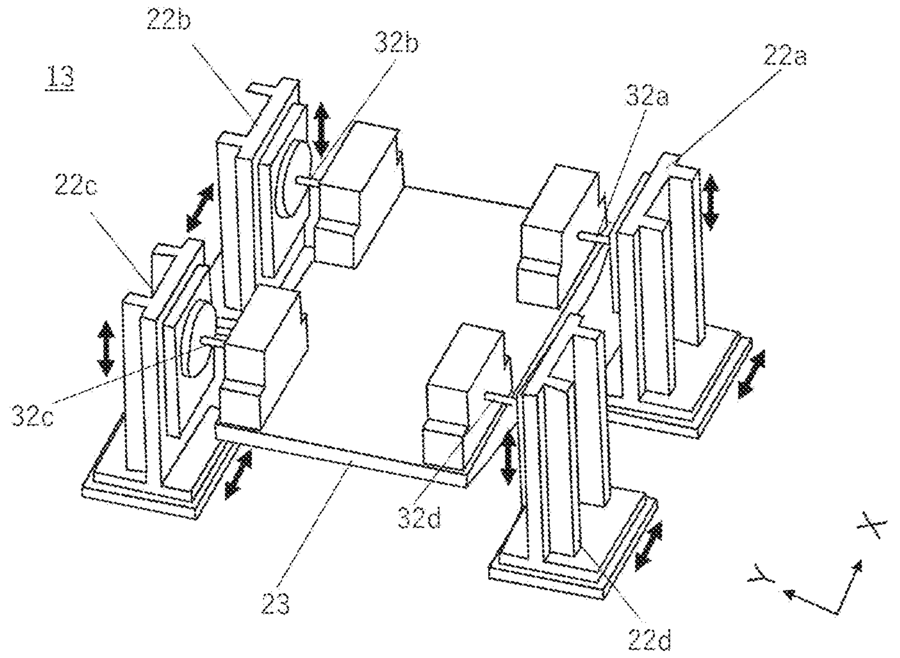
FIG. 7A is a perspective view of the arc swing unit of the embodiment.

Swing of the arc table 23 in the B, E, F, and G steps described in <Printing Method> will be described. FIG. 7A shows a perspective view of the arc swing unit 13.

In the arc swing unit 13, the arc table 23 is held by four drivers 22*a* to 22*d*. Each driver can move in the X-direction and the Z-direction. Each driver and the arc table 23 are connected to each other through shafts 32*a* to 32*d*. The arc table 23 is rotatable about the shafts 32*a* to 32*d*. Hereinafter, in a case where the shafts 32*a* to 32*d* are not distinguished from each other, these shafts will be referred to as a shaft(s) 32.

The drivers 22*a* to 22*d* including the shafts 32 have three degrees of freedom in X-axis translation, Z-axis translation, and rotation about the Y-direction as a rotation center axis. The arc table 23 is regarded as a rigid body, and therefore, the drivers 22*a* to 22*d* are constrained as a result of connection with the arc table 23 and have three degrees of freedom at each end. Thus, the drivers 22*a* to 22*d* may be driven, at each end, using three types of positioning devices only for translation or a combination of rotation and translation.

For example, three axes including the Z-axis and rotation center axis of the driver 22*a* and the Z-axis of the driver 22*d* are controlled by a drive device such as a motor, and other axes may be freely controlled using, e.g., a bearing or a linear guide. However, higher-accuracy positioning is available by the positioning devices only for translation, and therefore, three axes including the X-axis and Z-axis of the driver 22*a* and the Z-axis of the driver 22*d* or three axes including the Z-axis of the driver 22*a* and the X-axis and Z-axis of the driver 22*d* are preferably controlled by the drive device, and other axes are preferably freely controlled using, e.g., a bearing or a linear guide. The same also applies to a combination of the driver 22*b* and the driver 22*c*.

Figure 7B:
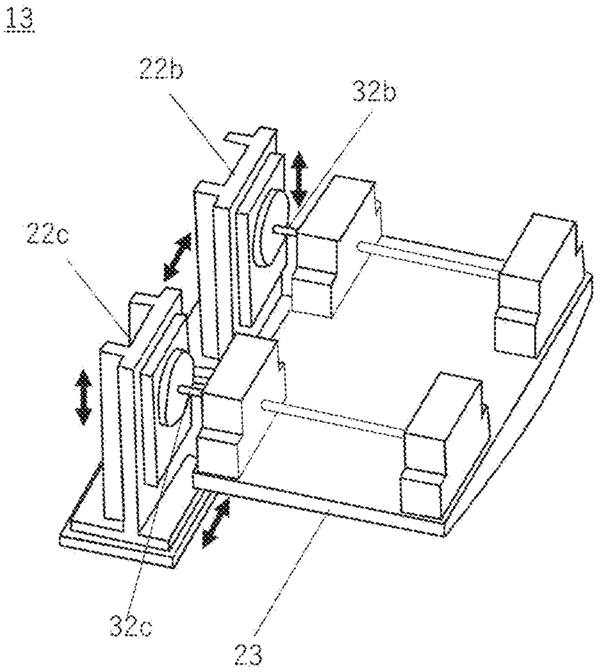
FIG. 7B is a perspective view of the arc swing unit of the embodiment.

Note that as shown in FIG. 7B, the drivers may be provided only at one end. The shaft 32 extends to the other end, and both ends are collectively controlled by the driver on one side. The shaft 32 of the driver causes one side of the arc table 23 to move horizontally and vertically, and accordingly, causes the other side to move vertically and horizontally. The arc table 23 and the shaft 32 of the driver are connected to each other through a bearing.

<Trochoid Curve Control>

In swing of the arc table 15 in the B, E, F, and G steps, the shafts 32*a* to 32*d* holding both ends of the arc table 15 may swing along a trochoid curve 40. That is, the shafts 32*a* to 32*d* swing along the trochoid curves 40 (movement paths of the shafts 32*a*, 32*d* from FIG. 6A to FIG. 6B) of the shafts 32*a*, 32*d* shown in FIG. 6B.

The trochoid curve is a curve traced out by a fixed point inside or outside a circle when the circle rolls along a certain curve (circle or straight line in a special case) without sliding.

Figure 8:
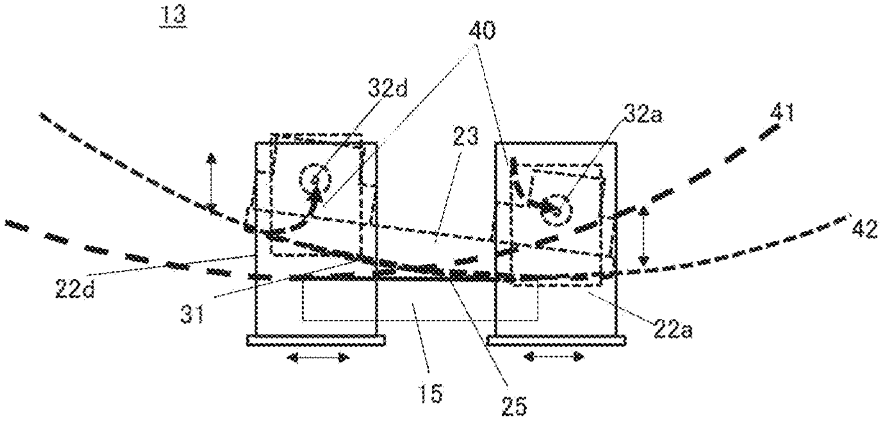
FIG. 8 is a view for describing control with a trochoid curve in the embodiment.

Specific description will be made with reference to FIG. 8. FIG. 8 is a view corresponding to FIG. 6B. A circle 42 is a circle including the arc surface of the arc table 23. A circle 41 is a circle including the arc surface of the arc table 23 of FIG. 6A. As the arc table 23 moves from FIG. 6A to FIG. 6B, the circle moves from the circle 41 to the circle 42. The shafts 32*d*, 32*a* are controlled such that the paths of the shafts 32*d*, 32*a* are along the trochoid curves, so that the circle can move from FIG. 6A to FIG. 6B.

The control along the trochoid curves allows the surface of the transfer sheet 31 to move with a constant amount of pressing without sliding on the surface of the target 25. Thus, the printing pattern 29 can be formed with less misalignment. As described in <Swing>, the shafts 32 can move along the trochoid curves, for example, only by translation of the drivers 22*a* to 22*d* in the X-direction and the Z-direction. Moreover, the arc table 23 with a great curvature radius can be used, and therefore, an effect of reducing the amount of dimensional change in the printing pattern can be produced even in the case of a great amount of pressing and high positioning accuracy can be provided. Note that an device that performs printing by rotating a cylindrical roll by a rotating motor requires a rotating motor with a higher torque as the curvature radius of the roll increases. Further, due to variation in the rotation speed of the rotating motor, roll surface positioning accuracy is lowered in proportion to the radius of the roll. According to the present invention, a positioning error in such a roll rotation type printing device can be avoided.

Figure 9A:
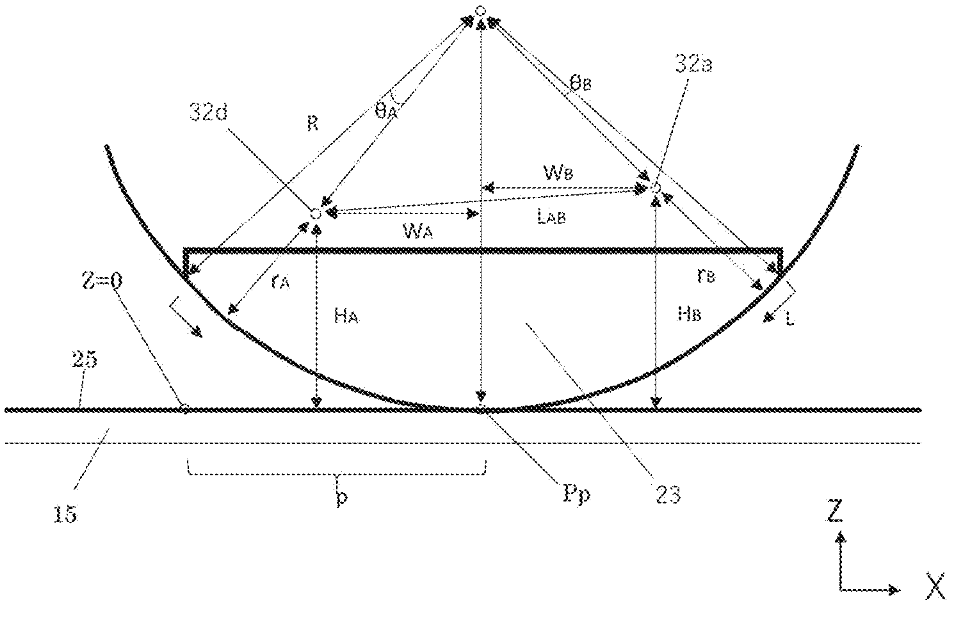
FIG. 9A is a side view of the arc table and a substrate table of the embodiment.
Figure 9B:
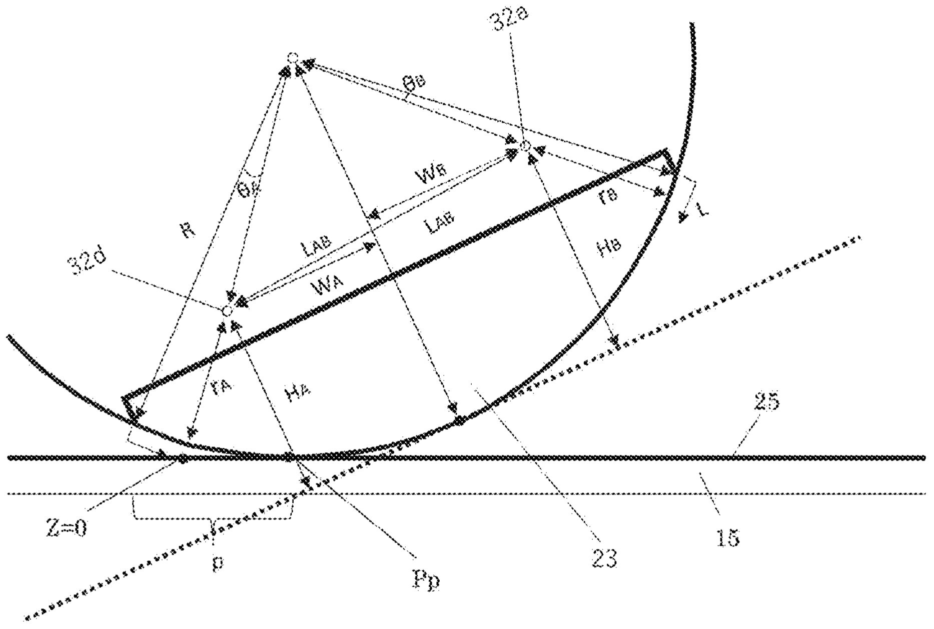
FIG. 9B is a side view of the arc table and the substrate table of the embodiment.

Regarding the trochoid curve control of the shafts 32*d*, 32*a*, a combination of the drivers 22*d*, 22*a* will be described as an example. For the sake of simplicity in description, it is assumed that the surface of the target 25 is a horizontal flat surface and the height thereof is z=0. FIGS. 9A and 9B show each parameter. FIGS. 9A and 9B are different from each other in the posture of the arc table 23.

The X-axis and Z-axis of the driver 22*d* are moved according to the following expressions:

[Expression 1]

$$x_A(R, L, W_A, H_A, p) = M_{xA}\left[p - (R + \Delta R - (r_A + \Delta r_A))\sin\left(\frac{p}{R + \Delta R} - (\theta_A + \Delta\theta_A)\right)\right] + \Delta x_A \tag{1}$$

[Expression 2]

$$z_A(R, L, W_A, H_A, p) = M_{zA}\left[R - (R + \Delta R - (r_A + \Delta r_A))\cos\left(\frac{p}{R + \Delta R} - (\theta_A + \Delta\theta_A)\right)\right] + \Delta z_A \tag{2}$$

The X-axis and Z-axis of the driver 22*a* are moved according to the following expressions (note that as described in <Swing>, for example, the X-axis of the driver 22*a* may only follow the linear guide without being controlled in order to avoid excessive constraint, and in this case, $x_B$ shown in Expression (3) only indicates the position of the linear guide and is not used for the control):

[Expression 3]

$$x_B(R, L, W_B, H_B, p) = M_{xB}\left[p - (R + \Delta R - (r_B + \Delta r_B))\sin\left(\frac{p}{R + \Delta R} - (\theta_c - \theta_B - \Delta\theta_B)\right)\right] + \Delta x_B \tag{3}$$

[Expression 4]

$$z_B(R, L, W_B, H_B, p) = M_{zB}\left[R - (R + \Delta R - (r_B + \Delta r_B))\cos\left(\frac{p}{R + \Delta R} - (\theta_c - \theta_B - \Delta\theta_B)\right)\right] + \Delta z_B \tag{4}$$

Here, R and L are the curvature radius and arc length of the arc table 23. $W_A$ and $H_A$ are horizontal and vertical distances from an intersection between a perpendicular line passing through the center of the arc and the surface of the circle to the shaft 32*d* of the driver 22*d* when the arc is in the horizontal posture. Similarly, $W_B$ and $H_B$ are horizontal and vertical distances from the intersection between the perpendicular line passing through the center of the arc and the surface of the circle to the shaft 32*a* of the driver 22*a* when the arc is in the horizontal posture. Moreover, $r_A$, $\theta_A$, $r_B$, $\theta_B$, and $\theta_C$ are variables determined by the following expressions:

[Expression 5]

$$r_A(R, W_A, H_A, t) = R + \Delta R - \sqrt{(W_A + \Delta W_A)^2 + (R + \Delta R - H_A - \Delta H_A)^2}$$

[Expression 6]

$$\theta_A(R, L, W_A, H_A, t) = \frac{\theta_C}{2} - \operatorname{asin}\left(\frac{W_A + \Delta W_A}{R + \Delta R - (r_A + \Delta r_A)}\right)$$

[Expression 7]

$$r_B(R, W_B, H_B, t) = R + \Delta R - \sqrt{(W_B + \Delta W_B)^2 + (R + \Delta R - H_B - \Delta H_B)^2}$$

[Expression 8]

$$\theta_B(R, L, W_B, H_B, t) = \frac{\theta_C}{2} - \operatorname{asin}\left(\frac{W_B + \Delta W_B}{R + \Delta R - (r_B + \Delta r_B)}\right)$$

[Expression 9]

$$\theta_C(R, L, t) = \frac{L + \Delta L}{R + \Delta R}$$

p is the mediator variable of the trochoid curve, can be the value of a virtual axis for synchronously controlling the shafts 32*a* to 32*d* of the drivers 22*a* to 22*d*, and is in a relationship of $p=V_P t=x_P$ with the speed (translational component) $V_P$ of the arc swinging on the line of z=0 and a time t. Here, $x_P$ is an x component of an intersection between the arc and the line of z=0 and an x component of the lowest point $P_P$ of the arc.

Other variables starting with Δ are correction parameters having the meanings of Table 1, are used for changing the path of the shaft 32 for finely adjusting the positioning accuracy of the printing pattern 29, and is zero in a case where correction is not necessary. $M_{xA}$, $M_{zA}$, $M_{xB}$, and $M_{zB}$ are also correction parameters, are also used for changing the path of the shaft 32, and are one in a case where correction is not necessary.

The value of the correction parameter is preferably settable independently in the application step, the receiving step, and the transfer step. For example, even in a case where the flatness and posture of the printing plate table 12 and the substrate table 15 vary, the printing pressure can be brought close to a constant pressure by the correction parameter.

Similarly, the trochoid control is performed on the drivers 22*b*, 22*c* in a similar manner so that the arc swing unit 13 can be swung. In a case where the surface of the target 25 is curved, Expressions (1) to (4) for the trochoid curve control may be changed according to such a curved surface.

TABLE 1

| Correction Parameter | Shaft 32d of Driver 22d | Shaft 32a of Driver 22a |
|---|---|---|
| X-axis Offset | $\Delta x_A$ | $\Delta x_B$ |
| Z-axis Offset | $\Delta z_A$ | $\Delta z_B$ |
| r-coordinate Offset | $\Delta r_A$ | $\Delta r_B$ |
| θ-coordinate Offset | $\Delta\theta_A$ | $\Delta\theta_B$ |
| Shaft Horizontal Position Offset | $\Delta W_A$ | $\Delta W_B$ |
| Shaft Vertical Position Offset | $\Delta H_A$ | $\Delta H_B$ |

TABLE 1-continued

| Correction Parameter | Shaft 32d of Driver 22d | Shaft 32a of Driver 22a |
|---|---|---|
| Arc Length Offset | ΔL | |
| Curvature Radius Offset | ΔR | |
| X-axis Diffusion Coefficient | $M_{xA}$ | $M_{xB}$ |
| Z-axis Diffusion Coefficient | $M_{zA}$ | $M_{zB}$ |

<Correction Method>

It is assumed that the drivers 22*a* to 22*d* are moved with R, L, $W_A$, $H_A$, $W_B$, and $H_B$ as input values according to Expressions (1) to (4) above while the mediator variable p is changing, but true values are R*, L*, $W_A$*, $H_A$*, $W_B$*, and $H_B$* which are different from the input values. In this case, the arc swing does not coincide with ideal motion. A method of properly determining the correction parameters to bring the arc swing close to the ideal swing in this case will be described. Note that the true value changes due to a machining error, a measurement error, an assembly error, and strain caused over time, such as creep, and cannot be easily measured. For this reason, the correction method described here is particularly important to accurately perform printing and solve the problems according to the present invention.

First, end portions of the shafts 32*d*, 32*a* will be described. A true inter-shaft distance between the shafts 32*d*, 32*a* is as follows:

[Expression 10]

$$L^*_{AB} = \sqrt{(W^*_B + W^*_A)^2 + (H^*_B - H^*_A)^2}$$

For the sake of convenience, the following expressions are defined:

[Expression 11]

$$\beta^* = \operatorname{asin}\left((H^*_B - H^*_A)/L^*_{AB}\right)$$

[Expression 12]

$$r^*_A = R^* - \sqrt{(W^*_A)^2 + (R^* - H^*_A)^2}$$

As a result of movement of the shafts 32*d*, 32*a*, the inclination angle of the arc is as follows:

[Expression 13]

$$\alpha(z_A, z_B) = \operatorname{asin}\left(\frac{z_B - z_A}{L^*_{AB}}\right) - \beta^*$$

Further, angles determined by the true values are defined as follows:

[Expression 14]

$$\theta^*_C(R^*, L^*) = \frac{L^*}{R^*}$$

[Expression 15]

$$\theta^*_A(R^*, L^*, W^*_A, H^*_A) = \frac{\theta^*_C}{2} - \operatorname{asin}\left(\frac{W^*_A}{R^* - r^*_A}\right)$$

In this case, the coordinates of the lowest point $P_P$ of the arc are as follows:

[Expression 16]

$$x_P = (R^* - r^*_A)\sin\left(\frac{\theta^*_C}{2} - \theta^*_A - \alpha(z_A, z_B)\right) + x_A \quad (5)$$

-continued

[Expression 17]

$$z_P = (R^* - r_A^*)\cos\left(\frac{\theta_C^*}{2} - \theta_A^* - \alpha(z_A, z_B)\right) + z_A - R^* \quad (6)$$

As described above, the deviation between the true value and the input value and the path through which the lowest point of the arc passes can be associated with each other. Specifically, the laser measurement described above in "B: Measurement of Swing of Arc Table 23" may be performed on the surface of the arc table 23 close to the end portions of the shafts 32*d*, 32*a*, the result thereof may be compared with Expression (6), and the correction parameters of (2) and (4) may be changed such that $z_P$ of the lowest point of the arc table 23 is maintained constant. Operation similar to that described above is also performed on end portions of the shafts 32*b*, 32*c*.

In a case where correction is made also in consideration of influence of posture errors in the printing plate table 12 and the substrate table 15, for example, a pressure sensitive film (for example, PRESCALE 5LW manufactured by FUJIFILM corporation) or a pressure sensor sheet may be placed on the surface of the substrate table 15, and the correction parameters may be changed such that pressure distribution is brought uniform. In this case, the measurement by the laser displacement meter is not necessary. In a case where there is no laser displacement meter, an inclinometer may be placed on the upper surface of the arc table 23, and the correction parameters may be changed in comparison with $\alpha(z_A, z_B)$. However, the measurement by the laser displacement meter is preferable in terms of quantitativeness.

It is difficult to measure the coordinates $x_P$ of the lowest point $P_P$ of the arc in the X-direction by the method described above in "B: Measurement of Swing of Arc Table 23," but after correction has been made by the above-described method such that the coordinates $z_P$ of the lowest point $P_P$ in the Z-direction is brought constant, an actual amount of elongation of the printing pattern 29 in the X-direction may be obtained, and the scale factor thereof may be substituted into $M_{xA}$. As described above, according to the correction method of the present invention, a printing method capable of obtaining, without the need for essential human experience, a correction value with high accuracy, less machine error, and excellent reproducibility can be provided.

Note that the correction parameters are not necessarily limited to only the functional types defined in Expressions (1) to (4), and for example, higher-order correction may be made, for example, using the correction parameters as the function of p.

EXAMPLES

Figure 10:
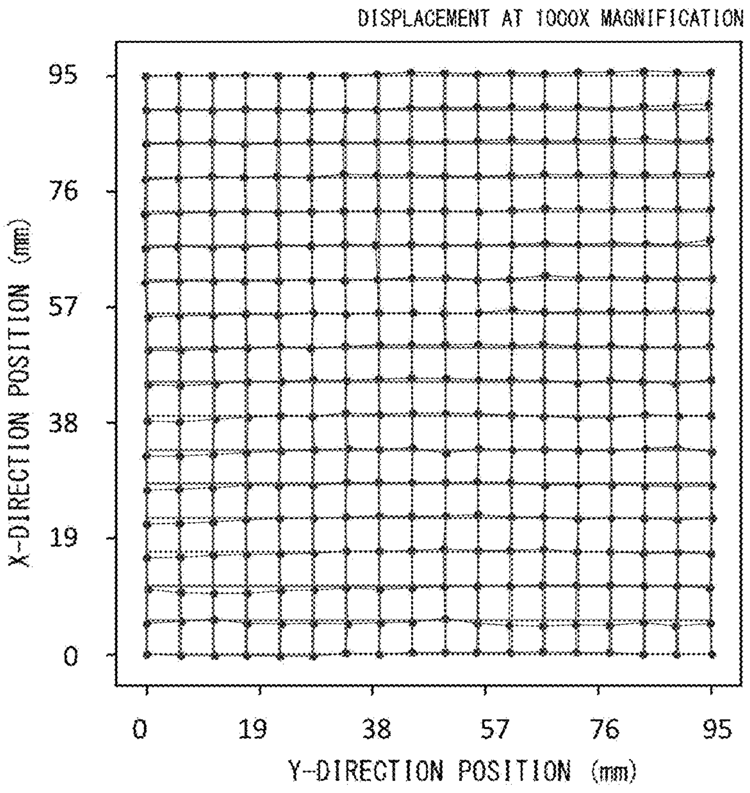
FIG. 10 is a view showing a printing result of the embodiment.

Under the following conditions, overprinting was actually performed (the same pattern was printed in an overlapping manner). Results are shown in FIG. 10 and Table 3. Table 2 shows correction values of Example 1. FIG. 10 is a plan view of the printed result.

Example 1 is an example in a case (results are shown in FIG. 10) where the input values of Expressions (1) to (4) for the trochoid curve control were machine design values (specifically, R=2000 mm, L=320 mm, $W_A$=160 mm, $H_A$=90 mm, $W_B$=160 mm, and $H_B$=90 mm) and printing was performed by swinging the arc table 23 by trochoid control with correction parameters shown in Table 2.

Example 2 is an example in a case where the input values of Expressions (1) to (4) for the trochoid curve control were machine design values (specifically, R=2000 mm, L=320 mm, $W_A$=160 mm, $H_A$=90 mm, $W_B$=160 mm, and $H_B$=90 mm) and printing was performed by swinging the arc table 23 by trochoid control without correction except that ΔR=1.264 mm was set as a correction parameter for taking the thickness of the transfer sheet 31 into consideration.

A comparative example is an example in a case where printing was performed using a printing device different from those of the examples by normal control in which a circular columnar roll having a diameter of 255 mm is rotated in synchronization with translation of various tables. In this case, in order to reduce misalignment as much as possible, printing was performed after the printing pressure in the receiving step and the transfer step had been carefully adjusted with the circular columnar roll synchronized with translation of various tables.

In Example 1, Example 2, and the comparative example, printing was performed, in which a complementary pattern in the shape of a grid with a pitch of 5 mm is overprinted using nano silver ink by reverse offset printing on a chrome pattern of a photomask in the form of a grid with a pitch of 5 mm. As the printing plate 22, a silicon wafer embossed by dry etching was used. The photomask was aligned, and it was confirmed such that an error due to alignment is sufficiently small. The positions of the centers of gravity of the photomask pattern and the printing pattern were determined by image analysis, and misalignment was measured for the pattern at each grid point. Assuming that misalignment in the X-direction at each grid point defined when an address in the X-direction is i and an address in the Y-direction is j is $\Delta x_{i,j}$ and misalignment in the Y-direction is $\Delta y_{i,j}$, the square root of the mean squared error was obtained:

$$RMSE_x = \sqrt{\frac{1}{n}\sum_j\sum_i\left(\Delta x_{i,j} - \overline{\Delta x}\right)^2} \quad \text{[Expression 18]}$$

$$RMSE_y = \sqrt{\frac{1}{n}\sum_j\sum_i\left(\Delta y_{i,j} - \overline{\Delta y}\right)^2} \quad \text{[Expression 19]}$$

Here, n=ij is the total number of grid points, and in this pattern, 324.

$$\overline{\Delta x}, \overline{\Delta y} \quad \text{[Expression 20]}$$

is the average of $\Delta x_{i,j}$ and the average of $\Delta y_{i,j}$. RMSEx<0.7 μm and RMSEy<0.7 μm were taken as acceptable.

From Table 3, Example 1 is the most preferable. Since the arc table 23 was controlled by the corrected trochoid control, there was almost no misalignment.

In Example 2, misalignment was slightly caused as compared to Example 1.

In the comparative example, since rotation of the circular columnar roll and translation of the table are merely synchronized with each other, misalignment due to uneven rotation was caused, and misalignment in a direction in which printing progresses was particularly great.

TABLE 2

| Correction Parameter | Shaft 32d of Driver 22d and Shaft 32c of Driver 22c | Shaft 32a of Driver 22a and Shaft 32b of Driver 22b |
|---|---|---|
| X-axis Offset [mm] | $\Delta x_A = 0$ | $\Delta x_B = 0$ |
| Z-axis Offset [mm] | $\Delta z_A = 0$ | $\Delta z_B = 0$ |
| r-coordinate Offset [mm] | $\Delta r_A = 0.07$ | $\Delta r_B = -0.03$ |
| θ-coordinate Offset [deg] | $\Delta\theta_A = 0$ | $\Delta\theta_B = 0$ |
| Shaft Horizontal Position Offset [mm] | $\Delta W_A = 0$ | $\Delta W_B = 0$ |
| Shaft Vertical Position Offset [mm] | $\Delta H_A = 0$ | $\Delta H_B = 0$ |
| Arc Length Offset [mm] | $\Delta L = 0$ | |
| Curvature Radius Offset [mm] | $\Delta R = 1.264$ | |
| X-axis Diffusion Coefficient | $M_{xA} = 1$ | $M_{xB} = 1$ |
| Z-axis Diffusion Coefficient | $M_{zA} = 1$ | $M_{zB} = 1$ |

TABLE 3

| | Direction of Progress of Printing | Direction Perpendicular to Printing | Result |
|---|---|---|---|
| Example 1 (Trochoid Curve Control with Correction Parameters) | $RMSE_x = 0.36$ μm | $RMSE_y = 0.16$ μm | very good |
| Example 2 (Trochoid Curve Control without Correction Parameters) | $RMSE_x = 0.68$ μm | $RMSE_y = 0.33$ μm | good |
| Related Art (Printing by Circular Column) | $RMSE_x = 0.98$ μm | $RMSE_y = 0.43$ μm | bad |

<Effects>

In the printing device 100 of the embodiment, printing can be performed with favorable position accuracy because of the following reasons.

(1) Since not the circular columnar roll but the arc table is used, the curved surface with a great curvature radius can be used and the misalignment of the printing pattern 29 due to the printing pressure is reduced. The circular columnar roll having the curved surface with a great curvature radius is heavy.

(2) The circular columnar roll is not rolled by the rotation mechanism. The error caused in proportion to the curvature radius of the circular columnar roll, such as an angular transmission error or angular velocity variation, is eliminated, and the misalignment of the roll surface due to such an error is eliminated.

(3) The number of shafts for controlling the arc swing is great, and correction is facilitated.

(4) The entire printing step can be performed on one conveyor 16.

(5) During the receiving step and the transfer step, only the arc table 23 is moved, and the printing plate table 12 and the substrate table 15 are fixed. There is no need for the control in which rotation of the circular columnar roll and translation of the printing plate table are synchronized with each other, which is necessary for the mechanism that rotates the circular columnar roll.

Overview

The above-described embodiments can be combined.

The transfer sheet 31 is set on the arc table 23, and the printing plate 22 is set on the printing plate table 12. However, the transfer sheet 31 may be set on the printing plate table 12, and the printing plate 22 may be set on the arc table 23. In this case, the printing plate 22 is a printing plate having the printing pattern 29. The ink is supplied from the transfer sheet 31 to the printing plate 22, and the pattern is printed onto the target 25 from the printing plate 22.

Note that in the trochoid control, the circle moves, but an ellipse may move. In this case, the ratio or sizes of the long side and short side of the ellipse are adjusted so that printing can be performed with higher accuracy.

In the above-described embodiments, the transfer sheet 31 is set on the arc table 23, the target 25 is set on the substrate table 15, and the ink of the transfer sheet 31 is transferred onto the target 25.

However, the transfer sheet 31 may be set on the substrate table 15, the target 25 may be set on the arc table 23, and the ink of the transfer sheet 31 may be transferred onto the target 25. In this case, the printing pattern 29 needs to be formed in the transfer sheet 31 on the substrate table 15. For example, a uniform ink layer may be formed on the transfer sheet 31, and the ink other than the printing pattern 29 may be removed by the printing plate 22. The die coater 21 and the printing plate table 12 can be positioned above the transfer sheet 31. Alternatively, for example, the printing pattern 29 may be formed at another position in the transfer sheet 31 on the substrate table 15, and the substrate table 15 may be disposed on the conveyor 16.

INDUSTRIAL APPLICABILITY

The printing device of the invention of the present application can be used for manufacturing various devices, such as electrode formation. The reverse offset printing has been described in detail, but the mechanism that performs printing by swinging the arc by the trochoid control is also applicable to other transfer printing methods in nature. The device configuration is changed as necessary so that the printing device can also be used, e.g., for relief printing, flexographic printing, adhesion contrast printing, and gravure offset printing.

DESCRIPTION OF REFERENCE CHARACTERS

11 Application Table
12 Printing Plate Table
13 Arc Swing Unit
14 Alignment Unit
15 Substrate Table
16 Conveyor
19 Mount
21 Die Coater
22 Printing Plate
**22*a*, 22*b*, 22*c*, 22*d*** Driver
23 Arc Table
**24*a*** First Recognizer
**24*b*** Second Recognizer
25 Target
27 Recessed Portion
28 Raised Portion
29 Printing Pattern
31 Transfer Sheet
32, **32*a*, 32*b*, 32*c*, 32*d*** Shaft

34 Controller
40 Trochoid Curve
41, 42 Circle
100 Printing Device

The invention claimed is:

1. A printing device comprising:

a substrate table having a flat surface;

an arc table having a curved portion; and a controller, wherein the controller moves the arc table in a state in which the curved portion holding ink faces the substrate table holding a target and causes the arc table to contact the target, or moves the arc table in a state in which the arc table holding a target faces the substrate table holding ink and causes the substrate table to contact the target, thereby transferring the ink onto the target, wherein the arc table is swung by moving a shaft holding the arc table along a trochoid curve.

2. The printing device according to claim 1, wherein the swing is along a trochoid curve with a corrected parameter, and the corrected parameter is set such that a lowest surface of the arc table is at a certain height.

3. The printing apparatus according to claim 1, wherein the shaft has three degrees of freedom.

4. The printing apparatus according to claim 3, wherein the three degrees of freedom is three degrees of freedom in X-axis translation, Z-axis translation, and rotation about the Y-direction as a rotation center axis.

5. A printing device comprising:

a substrate table having a flat surface;

an are table having a curved portion; and a controller, wherein the controller moves the arc table in a state in which the curved portion holding ink faces the substrate table holding a target and causes the arc table to contact the target, or moves the arc table in a state in which the arc table holding a target faces the substrate table holding ink and causes the substrate table to contact the target, thereby transferring the ink onto the target, wherein plural shafts hold the arc table and are configured to move horizontally and vertically to swing the arc table, and wherein each shaft of the plural shafts has three degrees of freedom.

6. The printing apparatus according to claim 5, wherein the three degrees of freedom is three degrees of freedom in X-axis translation, Z-axis translation, and rotation about the Y-direction as a rotation center axis.

* * * * *